United States Patent
Liu

(10) Patent No.: US 11,129,204 B2
(45) Date of Patent: Sep. 21, 2021

(54) RANDOM ACCESS METHOD, USER EQUIPMENT, AND NETWORK DEVICE

(71) Applicant: Huawei Technologies Co., Ltd., Shenzhen (CN)

(72) Inventor: Jianqin Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/504,022

(22) Filed: Jul. 5, 2019

(65) Prior Publication Data
US 2019/0335511 A1    Oct. 31, 2019

Related U.S. Application Data

(63) Continuation of application No. PCT/CN2017/116834, filed on Dec. 18, 2017.

(30) Foreign Application Priority Data

Jan. 6, 2017  (CN) .......................... 201710012117.5

(51) Int. Cl.
*H04W 74/00*  (2009.01)
*H04W 74/08*  (2009.01)
(Continued)

(52) U.S. Cl.
CPC ....... *H04W 74/0833* (2013.01); *H04W 24/10* (2013.01); *H04W 52/367* (2013.01); *H04W 72/0473* (2013.01); *H04W 76/11* (2018.02)

(58) Field of Classification Search
CPC ....... H04B 7/06; H04B 7/0617; H04W 24/10; H04W 48/12; H04W 52/14;
(Continued)

(56) References Cited

U.S. PATENT DOCUMENTS 9,451,630 B2 *  9/2016  Chen .................. H04W 72/1215
10,182,459 B2 *  1/2019  Murray ................. H04L 5/0023
(Continued)

FOREIGN PATENT DOCUMENTS

CN      101373994 A      2/2009
CN      101836479 A      9/2010
(Continued)

OTHER PUBLICATIONS

Liang et al, Non-Orthogonal Multiple Access for 5G and Beyond, IEEE, 15 pages, Jul. 2017.*
(Continued)

*Primary Examiner* — Frank Duong
(74) *Attorney, Agent, or Firm* — Slater Matsil, LLP

(57) ABSTRACT

A random access method, user equipment, and a network device are provided to reduce interference to a neighboring cell. The method includes: receiving at least two groups of random-access configuration parameters from a network device, where each group of random-access configuration parameters includes a power adjustment step for retransmission of a random access preamble; selecting one group of random-access configuration parameters from the at least two groups of random-access configuration parameters based on a threshold; determining transmit power of the random access preamble based on a power adjustment step for retransmission of the random access preamble in the selected random-access configuration parameters; and sending the random access preamble to the network device at the transmit power.

39 Claims, 4 Drawing Sheets

(51) Int. Cl.
*H04W 76/11* (2018.01)
*H04W 24/10* (2009.01)
*H04W 52/36* (2009.01)
*H04W 72/04* (2009.01)

(58) Field of Classification Search
CPC ... H04W 52/146; H04W 52/18; H04W 52/24; H04W 52/246; H04W 52/32; H04W 52/36; H04W 52/367; H04W 52/48; H04W 52/50; H04W 52/58; H04W 72/04; H04W 72/0473; H04W 74/006; H04W 74/008; H04W 74/08; H04W 74/0833; H04W 76/11
See application file for complete search history.

(56) References Cited

U.S. PATENT DOCUMENTS

| | | | |
|---|---|---|---|
| 10,367,677 B2 * | 7/2019 | Parkvall | H04W 52/0245 |
| 10,420,032 B2 * | 9/2019 | Hu | H04W 74/0833 |
| 10,681,646 B2 * | 6/2020 | Liu | H04W 52/146 |
| 2010/0056153 A1 | 3/2010 | Attar et al. | |
| 2011/0051609 A1 | 3/2011 | Ishii et al. | |
| 2013/0040675 A1 | 2/2013 | Antó et al. | |
| 2013/0242730 A1 | 9/2013 | Pelletier et al. | |
| 2014/0269570 A1 * | 9/2014 | Du | H04W 72/1278 370/329 |
| 2015/0016312 A1 | 1/2015 | Li et al. | |
| 2015/0036617 A1 | 2/2015 | Guo et al. | |
| 2015/0359003 A1 * | 12/2015 | Kim | H04W 74/0891 370/336 |
| 2015/0382205 A1 | 12/2015 | Lee et al. | |
| 2016/0150571 A1 | 5/2016 | Pelletier et al. | |
| 2016/0174237 A1 | 6/2016 | Zhao et al. | |
| 2016/0308635 A1 | 10/2016 | Zhou et al. | |
| 2017/0303204 A1 | 10/2017 | Hu et al. | |
| 2018/0063800 A1 | 3/2018 | Zhang et al. | |
| 2018/0376409 A1 * | 12/2018 | Tani | H04W 48/10 |

FOREIGN PATENT DOCUMENTS

| | | |
|---|---|---|
| CN | 102132609 A | 7/2011 |
| CN | 103858493 A | 6/2014 |
| CN | 104754702 A | 7/2015 |
| CN | 105379336 A | 3/2016 |
| CN | 105992328 A | 10/2016 |
| EP | 3515130 A1 | 7/2019 |
| JP | 2014072580 A | 4/2014 |
| JP | 2016528791 A | 9/2016 |
| JP | 2018511236 A | 4/2018 |
| WO | 2013120442 A1 | 8/2013 |
| WO | 2015113229 A1 | 8/2015 |
| WO | 2016144789 A1 | 9/2016 |

OTHER PUBLICATIONS

Interdigital Comm. Corp., "Reissue of SMG2 L1 Documents on RACH Preamble Detection," TSG-RAN Working Group1 meeting #3, TSGR1#3(99)138, Stockholm, Sweden, Mar. 22-26, 1999, 36 pages.

* cited by examiner

RANDOM ACCESS METHOD, USER EQUIPMENT, AND NETWORK DEVICE

CROSS-REFERENCE TO RELATED APPLICATIONS

This application is a continuation of International Application No. PCT/CN2017/116834, filed on Dec. 18, 2017, which claims priority to Chinese Patent Application No. 201710012117.5, filed on Jan. 6, 2017. The disclosures of the aforementioned applications are hereby incorporated by reference in their entireties.

TECHNICAL FIELD

Embodiments of this application relate to the field of communications technologies, and more specifically, to a random access method, user equipment, and a network device.

BACKGROUND

In a random access procedure, user equipment (UE) sends a random access preamble to a network device through a physical random access channel (PRACH). If the network device detects the random access preamble, the network device sends a random access response to a user. If the user equipment has not received the random access response sent by the network device, the user equipment needs to send the random access preamble again to the network device. During retransmission of the random access preamble, the UE may use one or more of the following manners: performing power ramp based on a beam that is the same as a beam used in a previous transmission; or performing beam scanning by using a beam that is different from a beam used in a previous transmission; or switching to another random access resource that corresponds to a different receive beam, to perform the retransmission.

In a current system, because a random access channel (RACH) resource configured by the network device for the UE and a power ramp parameter of the UE are relatively simple, random access efficiency of the UE is relatively low. In addition, when the UE performs random access based on a plurality of candidate beamformed beams, blind power ramp on a candidate RACH resource may cause interference to a neighboring cell.

SUMMARY

Embodiments of this application provide a random access method, user equipment, and a network device, to reduce interference to a neighboring cell.

According to a first aspect, a random access method is provided, including: receiving, by user equipment (UE), at least two groups of random-access configuration parameters sent by a network device, where each group of random-access configuration parameters includes a maximum quantity of transmissions of a random access preamble and/or a power adjustment step for retransmission of the random access preamble; selecting, by the UE, one group of random-access configuration parameters from the at least two groups of random-access configuration parameters based on a quantity of transmit beams of the UE and/or a threshold; determining, by the UE, transmit power of the random access preamble based on a maximum quantity of transmissions of the random access preamble and/or a power adjustment step for retransmission of the random access preamble in the selected random-access configuration parameters; and sending, by the UE, the random access preamble to the network device at the transmit power.

Therefore, according to the random access method in this embodiment of this application, the network device configures the at least two groups of random-access configuration parameters for the UE, so that the UE may select one appropriate group of random-access configuration parameters based on an actual situation, for example, based on the quantity of transmit beams and the threshold, to perform random access, thereby reducing interference to a neighboring cell and improving access efficiency of all users on an entire network.

In a possible implementation, the selecting, by the UE, one group of random-access configuration parameters from the at least two groups of random-access configuration parameters based on a quantity of transmit beams of the UE and/or a threshold includes: when the quantity of transmit beams of the UE is greater than the threshold, selecting, by the UE, a first group of random-access configuration parameters from the at least two groups of random-access configuration parameters, where a maximum quantity of transmissions of the random access preamble in the first group of random-access configuration parameters is smallest in the at least two groups of random-access configuration parameters, and/or a power adjustment step for retransmission of the random access preamble in the first group of random-access configuration parameters is largest in the at least two groups of random-access configuration parameters; and/or when the quantity of transmit beams of the UE is less than or equal to the threshold, selecting, by the UE, a second group of random-access configuration parameters from the at least two groups of random-access configuration parameters, where a maximum quantity of transmissions of the random access preamble in the second group of random-access configuration parameters is largest in the at least two groups of random-access configuration parameters, and/or a power adjustment step for retransmission of the random access preamble in the second group of random-access configuration parameters is smallest in the at least two groups of random-access configuration parameters.

When the quantity of transmit beams of the UE is greater than the threshold, the first group of random-access configuration parameters is selected, to reduce a quantity of retransmissions of the random access preamble on an inappropriate beam, thereby reducing interference to a neighboring cell and shortening a RACH transmission processing delay of the UE.

In a possible implementation, the selecting, by the UE, one group of random-access configuration parameters from the at least two groups of random-access configuration parameters based on a quantity of transmit beams of the UE and/or a threshold includes: selecting, by the UE, one group of random-access configuration parameters from the at least two groups of random-access configuration parameters based on a correspondence between the quantity of transmit beams of the UE and each group of random-access configuration parameters.

In a possible implementation, the threshold includes at least one threshold; and the selecting, by the UE, one group of random-access configuration parameters from the at least two groups of random-access configuration parameters based on a quantity of transmit beams of the UE and/or a threshold includes: selecting, by the UE, one group of random-access configuration parameters from the at least two groups of random-access configuration parameters based on a correspondence between the at least one threshold and each group of random-access configuration parameters; or selecting, by the UE, one group of random-access configuration parameters from the at least two groups of random-access configuration parameters based on a correspondence between the at least one threshold, the quantity of transmit beams, and each group of random-access configuration parameters.

In a possible implementation, the receiving, by user equipment UE, at least two groups of random-access configuration parameters sent by a network device includes: receiving, by the UE, system information sent by the network device, where the system information includes the at least two groups of random-access configuration parameters; or receiving, by the UE, a broadcast message sent by the network device, where the broadcast message includes the at least two groups of random-access configuration parameters.

In a possible implementation, the system information further includes the threshold, or the broadcast message further includes the threshold.

According to a second aspect, a random access method is provided, including: sending, by a network device, at least two groups of random-access configuration parameters to user equipment (UE), where the random-access configuration parameters include a maximum quantity of transmissions of a random access preamble and/or a power adjustment step for retransmission of the random access preamble; and after the UE selects one group of random-access configuration parameters from the at least two groups of random-access configuration parameters, receiving, by the network device, the random access preamble sent by the UE, where transmit power of the random access preamble is determined by the UE based on a maximum quantity of transmissions of the random access preamble and/or a power adjustment step for retransmission of the random access preamble in the selected random-access configuration parameters.

Therefore, according to the random access method in this embodiment of this application, the network device configures the at least two groups of random-access configuration parameters for the UE, so that the UE may select one appropriate group of random-access configuration parameters based on an actual situation, for example, based on the quantity of transmit beams and the threshold, to perform random access, thereby reducing interference to a neighboring cell and improving access efficiency of all users on an entire network.

In a possible implementation, the sending, by a network device, at least two groups of random-access configuration parameters to user equipment UE includes: sending, by the network device, system information to the UE, where the system information includes the at least two groups of random-access configuration parameters; or sending, by the network device, a broadcast message to the UE, where the broadcast message includes the at least two groups of random-access configuration parameters.

In a possible implementation, the system information further includes a threshold, or the broadcast message further includes the threshold, and the threshold is used by the UE to select one group of random-access configuration parameters from the at least two groups of random-access configuration parameters.

According to a third aspect, a random access method is provided, including: receiving, by user equipment (UE), first resource configuration information sent by a network device, where the first resource configuration information is used to indicate N candidate random access channel (RACH) resources configured by the network device for the UE, and N≥2; sending, by the UE, a random access preamble to the network device on the N candidate RACH resources indicated by the first resource configuration information; receiving, by the UE, second resource configuration information sent by the network device, where the second resource configuration information includes identification information that identifies a target RACH resource, and the target RACH resource is one of the N candidate RACH resources; and sending, by the UE, the random access preamble to the network device on the target RACH resource identified by the identification information.

Therefore, according to the random access method in this embodiment of this application, the network device can select a relatively desired resource from the N candidate RACH resources based on the random access preamble sent by the UE on the N candidate RACH resources that are configured by the network device, and configure the relatively desired resource for the UE, so that the UE can use the RACH resource during next random access, thereby reducing interference to a neighboring cell while improving a success rate of random access of the UE.

In a possible implementation, the receiving, by user equipment (UE), first resource configuration information sent by a network device includes: receiving, by the UE, system information sent by the network device, where the system information includes the first resource configuration information; or receiving, by the UE, broadcast information sent by the network device, where the broadcast information includes the first resource configuration information.

In a possible implementation, the receiving, by the UE, second resource configuration information sent by the network device includes: receiving, by the UE, RACH scheduling information sent by the network device, where the RACH scheduling information includes the identification information.

In a possible implementation, the first resource configuration information further includes a maximum quantity of transmissions of the random access preamble or a power adjustment step for retransmission of the random access preamble or both that are configured by the network device for the UE.

In a possible implementation, each of the N candidate RACH resources corresponds to one receive beam of the network device.

According to a fourth aspect, a random access method is provided, including: sending, by a network device, first resource configuration information to user equipment (UE), where the first resource configuration information is used to indicate N candidate random access channel (RACH) resources configured by the network device for the UE, and N≥2; receiving, by the network device, a random access preamble sent by the UE on the N candidate RACH resources that are indicated by the first resource configuration information; and sending, by the network device, second resource configuration information to the UE, where the second resource configuration information includes identification information that identifies a target RACH resource, and the target RACH resource is one of the N candidate RACH resources.

Therefore, according to the random access method in this embodiment of this application, the network device can select a relatively desired resource from the N candidate RACH resources based on the random access preamble sent by the UE on the N candidate RACH resources that are configured by the network device, and configure the desired resource for the UE, so that the UE can use the RACH resource during next random access, thereby reducing interference to a neighboring cell while improving a success rate of random access of the UE.

In a possible implementation, the sending, by a network device, first resource configuration information to user equipment UE includes: sending, by the network device, system information to the UE, where the system information includes the first resource configuration information; or sending, by the network device, broadcast information to the UE, where the broadcast information includes the first resource configuration information.

In a possible implementation, the sending, by the network device, second resource configuration information to the UE includes: sending, by the network device, RACH scheduling information to the UE, where the RACH scheduling information includes the second resource configuration information.

In a possible implementation, the first resource configuration information further includes a maximum quantity of transmissions of the random access preamble or a power adjustment step for retransmission of the preamble or both that are configured by the network device for the UE.

In a possible implementation, each of the N candidate RACH resources corresponds to one receive beam of the network device.

According to a fifth aspect, user equipment (UE) is provided and configured to perform the method in any one of the first aspect or the possible implementations of the first aspect, or configured to perform the method in any one of the third aspect or the possible implementations of the third aspect. Specifically, the user equipment UE includes units configured to perform the method in any one of the first aspect or the possible implementations of the first aspect, or includes units configured to perform the method in any one of the third aspect or the possible implementations of the third aspect.

According to a sixth aspect, a network device is provided, and configured to perform the method in any one of the second aspect or the possible implementations of the second aspect, or configured to perform the method in any one of the fourth aspect or the possible implementations of the fourth aspect. Specifically, the network device includes units configured to perform the method in any one of the second aspect or the possible implementations of the second aspect, or includes units configured to perform the method in any one of the fourth aspect or the possible implementations of the fourth aspect.

According to a seventh aspect, user equipment (UE) is provided. The user equipment (UE) includes a memory and a processor. The memory is configured to store a computer program. The processor is configured to invoke the computer program from the memory and run the computer program, so that the UE performs the method in any one of the first aspect or the possible implementations of the first aspect, or performs the method in any one of the third aspect or the possible implementations of the third aspect.

According to an eighth aspect, a network device is provided. The network device includes a memory and a processor. The memory is configured to store a computer program. The processor is configured to invoke the computer program from the memory and run the computer program, so that the network device performs the method in any one of the second aspect or the possible implementations of the second aspect, or performs the method in any one of the fourth aspect or the possible implementations of the fourth aspect.

According to a ninth aspect, a computer readable storage medium is provided, and configured to store a computer program, where the computer program includes an instruction used to perform the method in any one of the first aspect to the fourth aspect or the possible implementations of the first aspect to the fourth aspect.

DETAILED DESCRIPTION OF ILLUSTRATIVE EMBODIMENTS

The following describes technical solutions in the embodiments of this application with reference to the accompanying drawings.

The technical solutions of this application may be applied to various communications systems, for example, a Global System for Mobile Communications (GSM), a Code Division Multiple Access (CDMA) system, a Wideband Code Division Multiple Access (WCDMA) system, a general packet radio service (GPRS) system, a Long Term Evolution (LTE) system, a Long Term Evolution Advanced (LTE-A) system, a Universal Mobile Telecommunications System (UMTS), and a 5G system.

User equipment (UE) may also be referred to as a terminal device, a mobile terminal, an access terminal, a subscriber unit, a subscriber station, a mobile station, a mobile console, a remote station, a remote terminal, a mobile device, a user terminal, a terminal, a wireless communications device, a user agent, or a user apparatus. The UE may communicate with one or more core networks through a radio access network (RAN). The UE may be a station (STA) in a wireless local area network (WLAN); or may be a cellular phone, a cordless phone, a Session Initiation Protocol (SIP) phone, a wireless local loop (WLL) station, a personal digital assistant (PDA) device, a handheld device or a computing device having a wireless communication function, another processing device connected to a wireless modem, an in-vehicle device, a wearable device, a terminal device in a future 5G network, a terminal device in a future evolved PLMN network, or the like.

A network device may be a device configured to communicate with a mobile device. The network device may be an access point (AP) in WLAN, or a base transceiver station (BTS) in GSM or code division multiple access (CDMA); or may be a NodeB (NB) in WCDMA; or may be an evolved NodeB (eNB or eNodeB) in Long Term Evolution (LTE), a relay station, an access point, an in-vehicle device, a wearable device, a network device in a future 5G network, a network device in a future evolved PLMN network, or the like.

Figure 1:
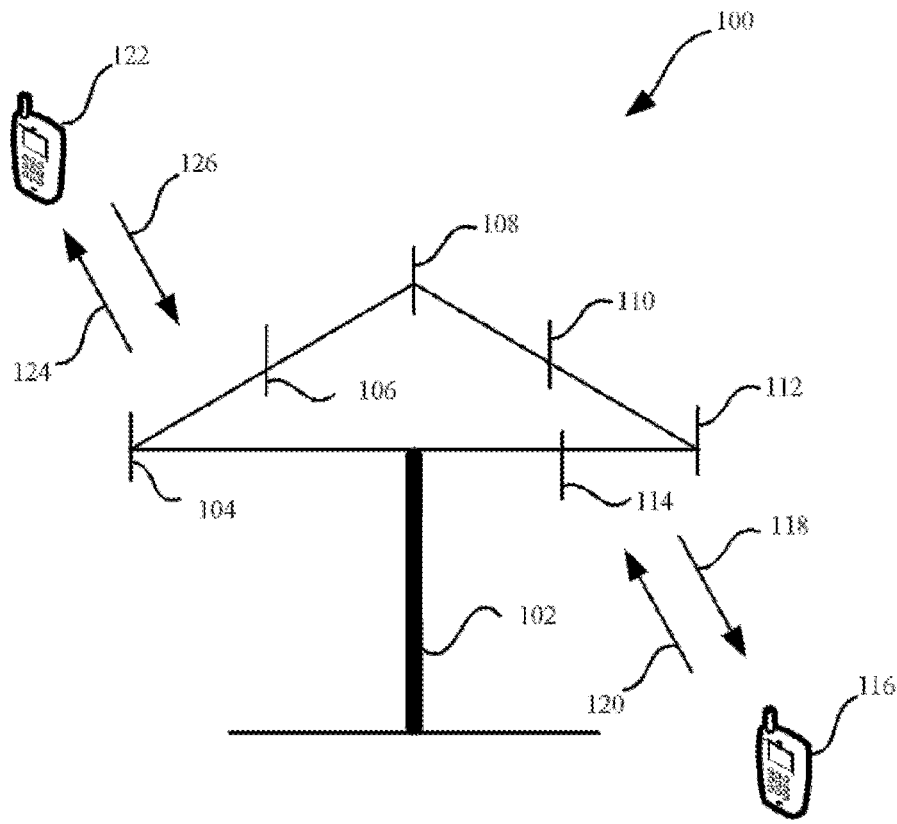
FIG. 1 is a schematic diagram of a communications system for a random access method according to an embodiment of this application.

FIG. 1 is a schematic diagram of a communications system for a random access method according to an embodiment of this application. As shown in FIG. 1, the communications system 100 includes a network device 102. The network device 102 may include a plurality of antennas, for example, antennas 104, 106, 108, 110, 112, and 114. Furthermore, the network device 102 may additionally include a transmitter chain and a receiver chain. A person of ordinary skill in the art may understand that the transmitter chain and the receiver chain each may include a plurality of components (for example, a processor, a modulator, a multiplexer, a demodulator, a demultiplexer, or an antenna) related to signal transmission and reception.

The network device 102 may communicate with a plurality of UEs (for example, UE 116 and UE 122). However, it may be understood that the network device 102 may communicate with any quantity of UEs similar to the UE 116 or the UE 122. The UE 116 and the UE 122 each may be, for example, a cellular phone, a smartphone, a portable computer, a handheld communications device, a handheld computing device, a satellite radio apparatus, a global positioning system, a PDA, and/or any other proper device configured to perform communication in the wireless communications system 100.

As shown in FIG. 1, the UE 116 communicates with the antenna 112 and the antenna 114. The antenna 112 and the antenna 114 send information to the UE 116 through a forward link 118, and receive information from the UE 116 through a reverse link 120. In addition, the UE 122 communicates with the antenna 104 and the antenna 106. The antenna 104 and the antenna 106 send information to the UE 122 through a forward link 124, and receive information from the UE 122 through a reverse link 126.

For example, in a frequency division duplex (FDD) system, the forward link 118 and the reverse link 120 may use different frequency bands, and the forward link 124 and the reverse link 126 may use different frequency bands.

For another example, in a time division duplex (TDD) system or a full duplex system, the forward link 118 and the reverse link 120 may use a same frequency band, and the forward link 124 and the reverse link 126 may use a same frequency band.

Each antenna group (including at least one antenna) and/or area designed for communication is referred to as a sector of the network device 102. For example, an antenna group may be designed to communicate with a terminal device in a sector of a coverage area of the network device 102. When the network device 102 communicates with the UE 116 and the UE 122 through the forward link 118 and the forward link 124 respectively, a transmit antenna of the network device 102 may use beamforming to improve a signal-to-noise ratio of the forward link 118 and a signal-to-noise ratio of the forward link 124. In addition, different from a case in which a network device sends, through an omnidirectional antenna, a signal to all UEs that can communicate with the network device in a coverage area of the network device, when the network device 102 sends a signal, by utilizing beamforming, to the UE 116 and the UE 122 randomly scattered in related coverage areas, a mobile device in a neighboring cell may suffer interference.

Figure 2:
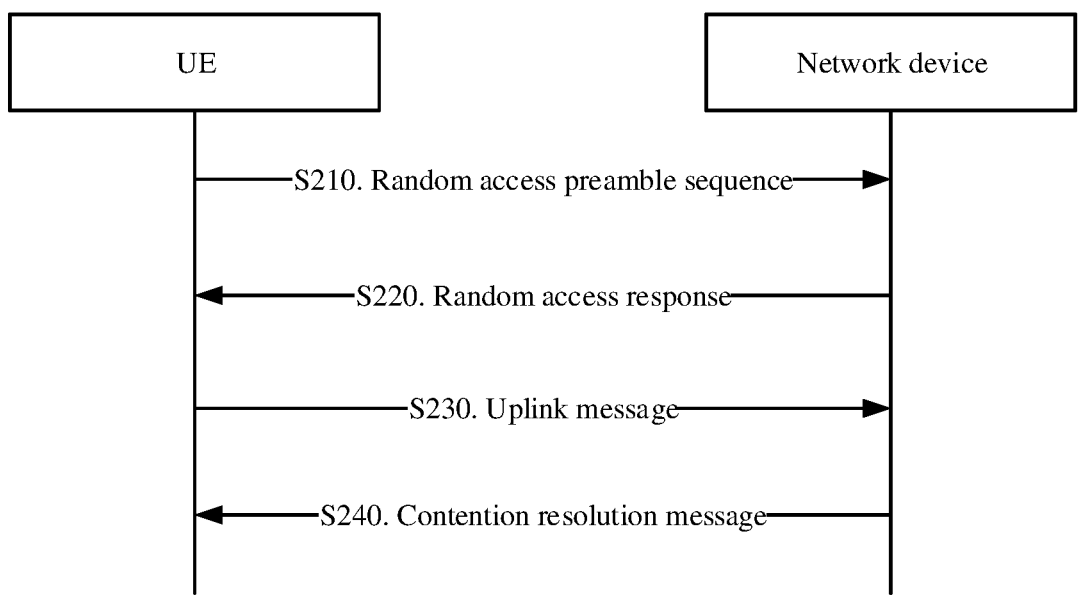
FIG. 2 is a schematic diagram of a random access procedure.

Before a network device transmits data with UE, the UE first needs to perform a random access procedure. As shown in FIG. 2, the random access procedure mainly includes the following steps.

S210. The UE randomly selects a random access preamble, and sends the random access preamble to the network device by using a RACH resource.

S220. After detecting the random access preamble, the network device sends a random access response to the UE.

The random access response includes the following three types of information: a number of the received random access preamble, a time adjustment amount corresponding to the received random access preamble, and location indication information of an uplink resource allocated to the UE.

S230. After receiving the random access response, the UE sends an uplink message on an allocated uplink resource based on location indication information of the uplink resource allocated to the UE.

The uplink message should include at least a unique identifier (ID) of the UE, for example, a temporary mobile subscriber identity (TMSI) or a random ID.

S240. The network device receives the uplink message from the UE, and returns a contention resolution message to UE that succeeds in accessing.

The contention resolution message includes at least a unique ID, a TMSI, or a random ID of the UE that succeeds in accessing.

In addition, for a RACH processing delay of the UE, to be specific, time taken by the UE to receive and process the random access response sent by the network device in S220 and S230, both a delay required for TDD-based UE and a delay required for FDD-based UE are 4 ms.

In S210, if the network device has not received the random access preamble from the UE, the random access preamble needs to be sent again to the network device. In the prior art, because a RACH resource configured by the network device for the UE and a power adjustment parameter of the UE are relatively simple, random access efficiency of the UE is relatively low. In addition, in the random access procedure of the UE, when the UE blindly increases transmit power of the random access preamble on an inappropriate beam, interference to a neighboring cell is caused.

Therefore, this application provides a random access method. In the method, the network device configures at least two groups of random-access configuration parameters for the UE, so that the UE can select an appropriate group of random-access configuration parameters based on an actual situation, to perform random access, thereby reducing interference to a neighboring cell and improving access efficiency.

Figure 3:
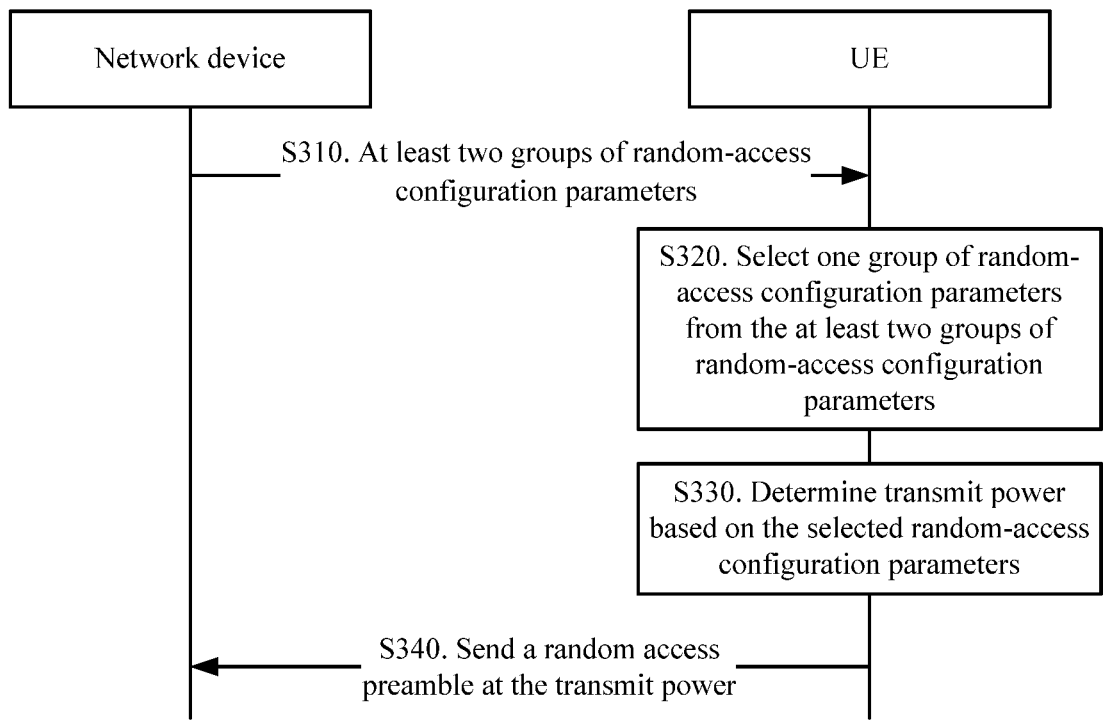
FIG. 3 is a schematic flowchart of a random access method according to an embodiment of this application.

FIG. 3 is a schematic flowchart of a random access method according to an embodiment of this application.

S310. A network device sends at least two groups of random-access configuration parameters to UE.

For example, each group of random-access configuration parameters may include a maximum quantity of transmissions of a random access preamble and/or a power adjustment step for retransmission of the random access preamble. In addition, each group of random-access configuration parameters may further include at least one of a preamble format of a RACH, received power of the RACH, a length correction value of the preamble, or the like.

For example, the network device may send the at least two groups of random-access configuration parameters to the UE by using system information or a broadcast message. In other words, the system information or the broadcast message may include the at least two groups of random-access configuration parameters.

For example, the system information is sent to the UE through a physical shared channel or a physical broadcast channel, or the broadcast message is sent to the UE through a physical broadcast channel.

S320. The UE selects one group of random-access configuration parameters from the at least two groups of random-access configuration parameters based on a quantity of transmit beams of the UE and/or a threshold.

The threshold may be a threshold of the quantity of transmit beams of the UE, or may be a quantity of RACH resources of the UE. One RACH resource corresponds to a threshold of one time-frequency resource location. There may be one or more thresholds.

For example, the UE may select one group of random-access configuration parameters based on the quantity of transmit beams of the UE.

For example, the UE may select one group of random-access configuration parameters based on a threshold of the quantity of RACH resources of the UE.

For example, the UE may select one group of random-access configuration parameters based on the threshold of the quantity of transmit beams of the UE.

For example, the UE may select one group of random-access configuration parameters based on the quantity of transmit beams of the UE and the threshold of the quantity of transmit beams of the UE.

The foregoing shows merely examples to help understand the present invention. The present invention includes, but is not limited to, the foregoing examples. It should be especially emphasized that the threshold may be alternatively channel quality or a quantity of receive beams of the network device. For example, the UE may select one group of random-access configuration parameters based on measurement of channel quality of different downlink signals. To be specific, the UE selects one group of random-access configuration parameters from the at least two groups of random-access configuration parameters depending on whether channel quality obtained through measurement of downlink signals corresponding to different transmit beams is greater than or less than or equivalent to a channel quality threshold. For example, each of downlink signals at different transmit moments may correspond to a group of random-access configuration parameters, the UE may select a downlink signal whose channel quality is greater than the channel quality threshold from a plurality of downlink signals, and the selected downlink signal corresponds to one group of random-access configuration parameters. The downlink signal may be at least one of a synchronization signal, a broadcast channel, a demodulation reference signal of a broadcast channel, or the like, and this is not limited in this embodiment of this application.

S330. The UE determines transmit power based on a maximum quantity of transmissions of a random access preamble and a power adjustment step for retransmission of the random access preamble in the selected random-access configuration parameters.

In an embodiment of this application, the transmit power P of the random access preamble satisfies the following formula:

$$P=\min\{P_{max}, PL+P_{o,pre}+\text{delta}_{pre}+(N_{pre}-1)dP_{rampup}\} \quad (1)$$

In formula (1), PL is a channel propagation loss value obtained by the UE based on measurement of a downlink signal; $P_{o,pre}$ is target power of a preamble that the network device expects to receive, a dynamic range is [−120, −90] dBm (decibel milliwatts), and a resolution is 2 dB (decibels); $\text{delta}_{pre}$ is a correction value for different random access preamble formats or lengths; $N_{pre}$ is a maximum quantity of transmissions of a random access preamble sent by the UE; $dP_{rampup}$ is a power adjustment step for retransmission of the random access preamble; and $P_{max}$ is maximum transmit power of the UE.

In this embodiment of this application, the UE may determine, by using formula (1) based on the maximum quantity of transmissions of the random access preamble and/or the power adjustment step for retransmission of the preamble in the selected random-access configuration parameters, transmit power at which the UE sends the random access preamble. It should be understood that this application is not limited to determining, by using formula (1), the transmit power at which the UE sends the random access preamble.

For example, a value of the maximum quantity of transmissions of the random access preamble in formula (1) may be any one of {3, 4, 5, 6, 7, 8, 10, 20, 50, 100, 200}; and the power adjustment step for retransmission of the random access preamble may be any one of {0, 2, 4, 6}dB.

S340. The UE sends the random access preamble to the network device at the transmit power.

Therefore, according to the random access method in this embodiment of this application, the network device configures the at least two groups of random-access configuration parameters for the UE, so that the UE may select one appropriate group of random-access configuration parameters based on an actual situation, to perform random access, for example, select one group of random-access configuration parameters in which a maximum quantity of transmissions of the random access preamble is smallest when the quantity of transmit beams of the UE is greater than the threshold, thereby reducing interference to a neighboring cell and improving access efficiency of all users on an entire network.

For example, in S320, the UE may select one group of random-access configuration parameters from the at least two groups of random-access configuration parameters in one or a combination of the following manners.

Manner 1

The UE selects one group of random-access configuration parameters from the at least two groups of random-access configuration parameters depending on whether the quantity of transmit beams of the UE is greater than or less than or equivalent to the threshold.

For example, when the quantity of transmit beams of the UE is greater than the threshold, the UE selects a first group of random-access configuration parameters from the at least two groups of random-access configuration parameters. A maximum quantity of transmissions of the random access preamble in the first group of random-access configuration parameters is smallest in the at least two groups of random-access configuration parameters, and/or a power adjustment step for retransmission of the random access preamble in the first group of random-access configuration parameters is largest in the at least two groups of random-access configuration parameters.

It should be understood that, the threshold includes at least one threshold. When there are a plurality of thresholds, that the quantity of transmit beams of the UE is greater than the threshold may be construed as that the quantity of transmit beams of the UE is greater than any one of the plurality of thresholds.

There is usually no reciprocity for receive and transmit beams of a user. In other words, an optimal downlink receive beam of a user is not equivalent to an optimal transmit beam of the user. Therefore, the user needs to perform training of the optimal transmit beam based on a relatively large quantity of candidate transmit beams. Specifically, when there is a relatively large quantity of transmit beams of the user, because there is no prior information of a possible direction of the optimal beam, some inappropriate beams may exist in the relatively large quantity of candidate transmit beams, and signal transmission based on these inappropriate beams may cause severe interference to a neighboring cell.

When the quantity of transmit beams of the UE is greater than the threshold, during random access, the user equipment may scan and poll, at initial transmit power, random access signals corresponding to all the beams. If the random access does not succeed upon end of first polling, when the user performs a second round of beam scanning, power ramp is performed sequentially on a random access signal corresponding to each beam. Some inappropriate beams exist in these beams. For example, a received signal of a current cell corresponding to a beam is very weak but causes relatively strong interference to a neighboring cell. If the UE performs power ramp for a plurality of times on these inappropriate beams, a relatively large rise in transmit power may cause interference to the neighboring cell. In this embodiment of this application, the smallest maximum quantity of transmissions of the random access preamble or the largest power adjustment step for retransmission of the random access preamble or both are selected, so that the UE can quickly terminate the power ramp on these inappropriate beams, thereby reducing interference to a neighboring cell.

Furthermore, in the foregoing embodiment, the maximum quantity of transmissions of the random access preamble in the first group of random-access configuration parameters and/or the power adjustment step for retransmission of the preamble in the first group of random-access configuration parameters may be set in another manner. For example, the maximum quantity of transmissions of the random access preamble in the first group of random-access configuration parameters is smallest in the at least two groups of random-access configuration parameters, and/or the power adjustment step for retransmission of the preamble in the first group of random-access configuration parameters is smallest in the at least two groups of random-access configuration parameters. This setting is applicable to a scenario in which the user sends the random access preamble by using a directional antenna (in other words, the quantity of transmit beams is greater than or equal to 1). In this case, as described in the foregoing analysis, because prior information of a beam direction has not been obtained yet, the user equipment needs to select, from the plurality of groups of random-access configuration parameters, a group of parameters in which a maximum quantity of transmissions of the random access preamble is smallest and/or a power adjustment step for retransmission of the preamble is smallest, to perform the sending, so as to avoid severe interference to a neighboring cell. Alternatively, the maximum quantity of transmissions of the random access preamble in the first group of random-access configuration parameters is largest in the at least two groups of random-access configuration parameters, and/or the power adjustment step for retransmission of the preamble in the first group of random-access configuration parameters is largest in the at least two groups of random-access configuration parameters. This is not limited herein. This setting is applicable to a scenario in which the user sends the random access preamble by using an omnidirectional antenna (in other words, there is one transmit beam). In this case, to improve a random access success rate of the user, the UE may select, from the plurality of groups of random-access configuration parameters, a group of parameters in which a maximum quantity of transmissions of the random access preamble is largest and/or a power adjustment step for retransmission of the preamble is largest, to implement fast access of the user.

In addition, if random access of the UE continually fails, a quantity of possible random access attempts of the user satisfies a formula: $N_{total} = N_{beam} \times N_p re$, where $N_{beam}$ is the quantity of transmit beams of the UE, and $N_{pre}$ is the maximum quantity of transmissions of the random access preamble sent by the UE. It can be learned from the foregoing formula that, when a maximum quantity of transmissions of the random access preamble on each transmit beam of the user is largest, a quantity of RACH sending attempts and a RACH sending delay also increase accordingly, thereby causing a corresponding increase in a random access delay of the user and a corresponding increase in random access processing complexity of the user. The smallest maximum quantity of transmissions of the random access preamble or the largest power adjustment step for retransmission of the preamble or both are selected, so that the quantity of possible random access attempts of the user decreases accordingly, thereby shortening a RACH transmission processing delay of the UE.

For example, when the quantity of transmit beams of the UE is less than or equal to the threshold, the UE may select a second group of random-access configuration parameters from the at least two groups of random-access configuration parameters. A maximum quantity of transmissions of the random access preamble in the second group of random-access configuration parameters is largest in the at least two groups of random-access configuration parameters, and/or a power adjustment step for retransmission of the random access preamble in the second group of random-access configuration parameters is smallest in the at least two groups of random-access configuration parameters.

It should be understood that, the threshold includes at least one threshold. When there are a plurality of thresholds, that the quantity of transmit beams of the UE is less than or equal to the threshold may be construed as that the quantity of transmit beams of the UE is less than or equal to a smallest threshold of the plurality of thresholds.

For example, in a case in which the quantity of transmit beams of the user is relatively small, for example, the transmit beams of the user are based on prior information of a transmit beam direction of the user, and the prior information may be estimated information of the user equipment about a transmit signal direction when the user performs sending by using a relatively small quantity of wide beams or when there is reciprocity for receive and transmit beams of the user. In this case, the transmit beams of the user are most probably aligned to the network device, and therefore the second group of random-access configuration parameters may be selected. In the second group of random-access configuration parameters, the maximum quantity of transmissions of the random access preamble is largest and/or the power adjustment step for retransmission of the random access preamble is smallest. It can be learned, from the foregoing analysis, that the UE performs random access for a relatively large quantity of times on the more accurately directional beams, and therefore a random access success rate of the UE is relatively high.

The maximum quantity of transmissions of the random access preamble in the second group of random-access configuration parameters and/or the power adjustment step for retransmission of the preamble in the second group of random-access configuration parameters may be alternatively set in another manner.

For example, the maximum quantity of transmissions of the random access preamble in the second group of random-access configuration parameters is smallest in the at least two groups of random-access configuration parameters, and/or the power adjustment step for retransmission of the preamble in the second group of random-access configuration parameters is largest in the at least two groups of random-access configuration parameters. This setting is applicable to a scenario in which the user sends the random access preamble by using a directional antenna (in other words, the quantity of transmit beams is greater than or equal to 1). In this case, as described in the foregoing analysis, because a relatively desired beamforming gain is obtained, the user equipment needs only to select, from the plurality of groups of random-access configuration parameters, a group of parameters in which a maximum quantity of transmissions of the random access preamble is smallest and/or a power adjustment step for retransmission of the preamble is largest, to perform the sending, so as to implement successful access. Alternatively, the maximum quantity of transmissions of the random access preamble in the second group of random-access configuration parameters is smallest in the at least two groups of random-access configuration parameters, and/or the power adjustment step for retransmission of the preamble in the second group of random-access configuration parameters is smallest in the at least two groups of random-access configuration parameters. This setting is applicable to a scenario in which the user sends the random access preamble by using a directional antenna (in other words, the quantity of transmit beams is greater than or equal to 1). In this case, as described in the foregoing analysis, because a relatively desired beamforming gain is obtained, the user equipment needs only to select, from the plurality of groups of random-access configuration parameters, a group of parameters in which a maximum quantity of transmissions of the random access preamble is smallest and/or a power adjustment step for retransmission of the preamble is smallest, to perform the sending, so as to implement successful access. This is not limited herein.

Manner 2

The UE selects one group of random-access configuration parameters from the at least two groups of random-access configuration parameters based on a correspondence between the quantity of transmit beams of the UE and each group of random-access configuration parameters.

Specifically, the UE may prestore the correspondence between the quantity of transmit beams of the UE and a group of the random-access configuration parameters. The correspondence may be predefined by a system or configured by the network device. The UE may select one group of random-access configuration parameters based on an actual quantity of transmit beams and the correspondence.

For example, the network device may configure four groups of random-access configuration parameters for the UE. The correspondence, stored by the UE, between the quantity of transmit beams of the UE and a group of random-access configuration parameters may be shown in Table 1.

TABLE 1

| Quantity of transmit beams of UE (beam) | Random-access configuration parameters (group) |
| --- | --- |
| 1 | 1 |
| 2-5 | 2 |
| 6-10 | 3 |
| ≥11 | 4 |

As shown in Table 1, when the quantity of transmit beams of the UE is 1, the UE may select a first group of random-access configuration parameters; or when the quantity of transmit beams of the UE is greater than or equal to 2 but less than or equal to 5, the UE may select a second group of random-access configuration parameters; or when the quantity of transmit beams of the UE is greater than or equal to 6 but less than or equal to 10, the UE may select a third group of random-access configuration parameters; or when the quantity of transmit beams of the UE is greater than 11, the UE may select a fourth group of random-access configuration parameters.

For the foregoing four groups of random-access configuration parameters, the maximum quantity of transmissions of the random access preamble decreases from the first group to the fourth group, and/or the power adjustment step for retransmission of the random access preamble increases from the first group to the fourth group. In this way, it can be learned, from the analysis of Manner 1, that the UE can implement quick access and interference to a neighboring cell can be reduced during access of the UE.

It should be understood that, Table 1 is merely a specific embodiment of the correspondence between the quantity of transmit beams of the UE and a group of the random-access configuration parameters, and the correspondence between the quantity of transmit beams of the UE and a group of the random-access configuration parameters may be another form. This is not particularly limited in this embodiment of this application. For example, each value of a quantity of transmit beams of a user, ranging from 1 to a maximum quantity of transmit beams of the user, corresponds to one group of random-access configuration parameters. For example, when a maximum quantity of transmit beams of a user is 15, a set {1, 2, . . . , 14, 15} of values of the quantity of transmit beams of the user corresponds to 15 groups of random-access configuration parameters.

Manner 3

The UE selects one group of random-access configuration parameters from the at least two groups of random-access configuration parameters based on a correspondence between the at least one threshold and each group of random-access configuration parameters.

Specifically, the threshold may be at least one of a quantity of random access resources, or the quantity of transmit beams of the user equipment, or the quantity of receive beams of the network device. For example, each random access resource corresponds to one transmit beam of the UE. The UE may prestore a correspondence between the threshold and a group of the random-access configuration parameters. The correspondence represented by using the threshold may be predefined by a system or configured by the network device. The UE may select one group of random-access configuration parameters based on the quantity of random access resources and the correspondence.

For example, the network device configures three groups of random-access configuration parameters for the UE. The correspondence, stored by the UE, between the quantity of random access resources of the UE and a group of the random-access configuration parameters may be shown in Table 2.

TABLE 2

| Threshold | Random-access configuration parameters (group) |
|---|---|
| 1 | 1 |
| 2-8 | 2 |
| ≥9 | 3 |

As shown in Table 2, when the quantity of random access resources of the UE is 1, the UE may select a first group of random-access configuration parameters; or when the quantity of random access resources of the UE is greater than or equal to 2 but less than or equal to 8, the UE may select a second group of random-access configuration parameters; or when the quantity of random access resources of the UE is greater than or equal to 9, the UE may select a third group of random-access configuration parameters. Herein, 1, 2, 8, and 9 are several thresholds represented by using the quantity of random access resources.

For the foregoing three groups of random-access configuration parameters, the maximum quantity of transmissions of the random access preamble decreases from the first group to the third group, and/or the power adjustment step for retransmission of the random access preamble increases from the first group to the third group. In this way, it can be learned, from the foregoing analysis, that the UE can implement quick access and interference to a neighboring cell can be reduced during access of the UE.

Figure 4:
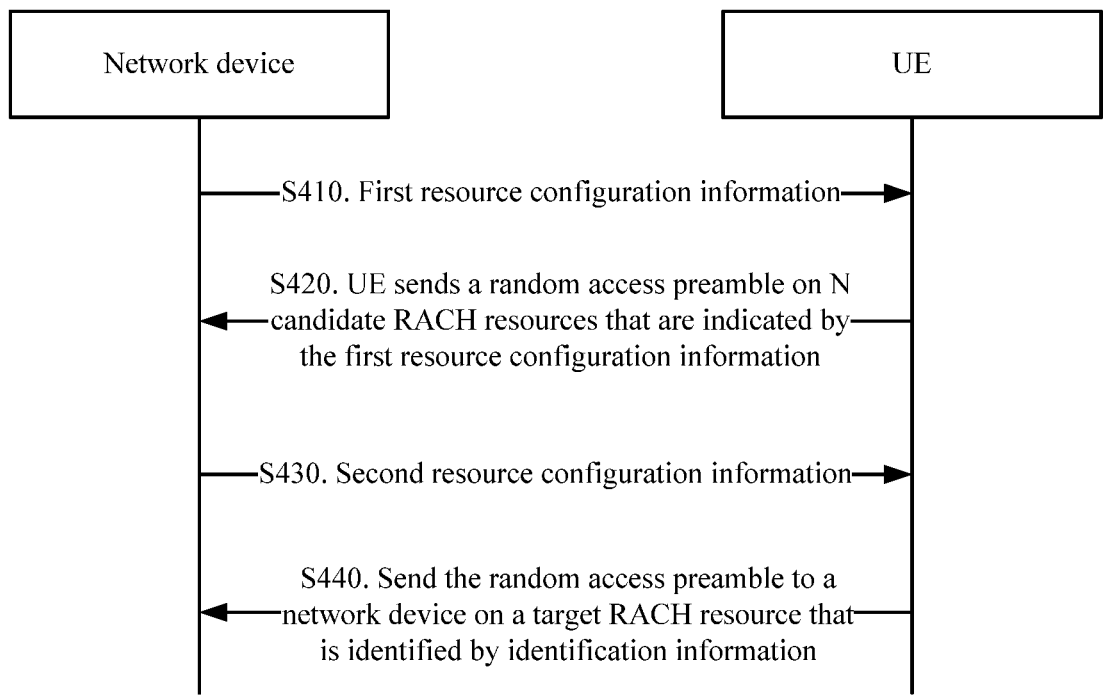
FIG. 4 is a schematic flowchart of a random access method according to another embodiment of this application.

FIG. 4 is a schematic flowchart of a random access method according to another embodiment of this application.

S410. A network device sends first resource configuration information to user equipment UE.

Specifically, the first resource configuration information is used to indicate N candidate random access channel (RACH) resources configured by the network device for the UE, where N≥2 and each candidate RACH resource corresponds to one time-frequency resource location.

For example, the network device may send the first resource configuration information to the UE by using system information. In other words, system information sent by the network device may include the first resource configuration information.

For example, the network device may send the first resource configuration information to the UE by using broadcast information. In other words, broadcast information sent by the network device may include the first resource configuration information.

For example, the first resource configuration information may include at least one of a time-domain resource location indication of a RACH, a frequency-domain resource location indication of the RACH, a format of a random access preamble of the RACH, or the like.

For example, the N candidate RACH resources may be determined by the network device based on receive beams of the network device, and each candidate RACH resource may correspond to one receive beam of the network device.

For example, the N candidate RACH resources correspond to N random access preambles, and the N random access preambles may be random access preambles transmitted by the UE on a plurality of transmit beams. In other words, each candidate RACH resource corresponds to one transmit beam of the UE.

S420. The UE sends a random access preamble to the network device on N candidate RACH resources indicated by the first resource configuration information.

When a user has not obtained a feedback after sending the random access preamble on a first candidate RACH resource in the N candidate RACH resources, the UE may switch to another candidate RACH resource in the N candidate RACH resources, to send the random access preamble. If the user still has not obtained any feedback, the UE switches again to a next candidate RACH resource, to send the random access preamble.

S430. The network device sends second resource configuration information to the UE, where the second resource configuration information includes identification information of a target RACH resource, and the target RACH resource is one of the N candidate RACH resources.

In S420, after the UE finishes a round of sending the random access preamble on the N candidate RACH resources, the network device may select, from the N candidate RACH resources, a relatively desired candidate RACH resource as the target RACH resource, and configure identification information of the target RACH resource for the UE. For example, based on at least one of measurement indicators such as received power and received quality of the random access preamble that is received on the N candidate RACH resources, the network device may select a RACH resource corresponding to a random access preamble whose received signal power is relatively high or whose received signal quality is relatively good as the target RACH resource to be configured for the UE. Because the network device has already sent specific configuration information of the RACH resource to the UE in S410, the network device may send only the identification information of the target RACH resource to the UE. When receiving the identification information, the UE can determine the target RACH resource indicated by the identification information.

For example, the network device may send the second resource configuration information to the UE by sending RACH scheduling information. In other words, RACH scheduling information sent by the network device to the UE may include the second resource configuration information. The RACH scheduling information is sent to the UE through a physical downlink control channel.

S440. The UE sends the random access preamble to the network device on the target RACH resource identified by the identification information.

Therefore, according to the random access method in this embodiment of this application, the network device can select a relatively desired resource from the N candidate RACH resources based on the random access preamble sent by the UE on the N candidate RACH resources that are configured by the network device, and configure the relatively desired resource for the UE, so that the UE can use the RACH resource during next random access, thereby reducing interference to a neighboring cell while improving a success rate of random access of the UE.

For example, in an embodiment of this application, the first resource configuration information or the RACH scheduling information may further include a maximum quantity of transmissions of the random access preamble or a power adjustment step for retransmission of the preamble or both that are configured by the network device for the UE.

Specifically, when performing random access based on the first resource configuration information or the RACH scheduling information, the UE may determine, based on the maximum quantity of transmissions of the random access preamble and/or the power adjustment step for retransmission of the preamble, transmit power for sending the random access preamble. In addition, the maximum quantity of transmissions of the random access preamble and/or the power adjustment step for retransmission of the preamble may be alternatively preconfigured by the network device; and the UE may determine, based on the preconfigured maximum quantity of transmissions of the random access preamble and/or the preconfigured power adjustment step for retransmission of the preamble, the transmit power at which the UE sends the random access preamble. For example, the UE may determine, according to the formula (1), the transmit power for sending the random access preamble; and then the UE may send, based on the determined transmit power, the random access preamble on the target RACH resource.

It should be understood that, the network device may further preconfigure, for the UE, at least one of parameters such as a preamble format of a RACH, received power of the RACH, and a format or length correction value of the preamble.

The random access method is described above in detail with reference to FIG. 3 and FIG. 4 according to the embodiments of this application. The following describes, in detail with reference to FIG. 5 to FIG. 8, a random access device according to the embodiments of this application. The random access device includes user equipment UE and a network device.

Figure 5:
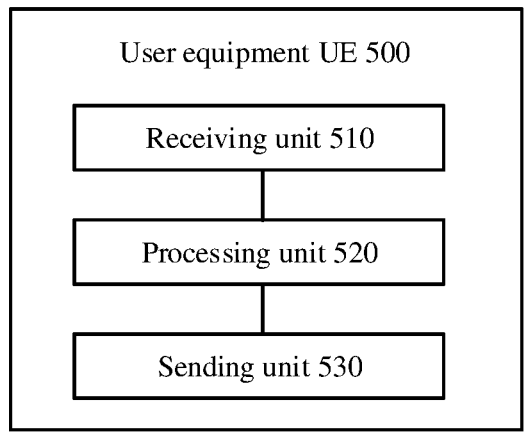
FIG. 5 is a schematic block diagram of user equipment UE according to an embodiment of this application.

FIG. 5 is a schematic block diagram of user equipment UE 500 according to an embodiment of this application. As shown in FIG. 5, the user equipment UE 500 includes a receiving unit 510, a processing unit 520, and a sending unit 530.

The receiving unit 510 is configured to receive at least two groups of random-access configuration parameters sent by a network device, where each group of random-access configuration parameters includes a maximum quantity of transmissions of a random access preamble and/or a power adjustment step for retransmission of the random access preamble.

The processing unit 520 is configured to: select one group of random-access configuration parameters from the at least two groups of random-access configuration parameters based on a quantity of transmit beams of the UE or a threshold or both that are received by the receiving unit 510; and determine transmit power of the random access preamble based on a maximum quantity of transmissions of the random access preamble and/or a power adjustment step for retransmission of the random access preamble in the selected random-access configuration parameters.

The sending unit 530 is configured to send the random access preamble to the network device at the transmit power determined by the processing unit 520.

For example, the processing unit 520 is specifically configured to: when the quantity of transmit beams of the UE is greater than the threshold, select a first group of random-access configuration parameters from the at least two groups of random-access configuration parameters, where a maximum quantity of transmissions of the random access preamble in the first group of random-access configuration parameters is smallest in the at least two groups of random-access configuration parameters, and/or a power adjustment step for retransmission of the random access preamble in the first group of random-access configuration parameters is largest in the at least two groups of random-access configuration parameters; and/or when the quantity of transmit beams of the UE is less than or equal to the threshold, select a second group of random-access configuration parameters from the at least two groups of random-access configuration parameters, where a maximum quantity of transmissions of the random access preamble in the second group of random-access configuration parameters is largest in the at least two groups of random-access configuration parameters, and/or a power adjustment step for retransmission of the random access preamble in the second group of random-access configuration parameters is smallest in the at least two groups of random-access configuration parameters.

For example, the processing unit 520 is specifically configured to select one group of random-access configuration parameters from the at least two groups of random-access configuration parameters based on a correspondence between the quantity of transmit beams of the UE and each group of random-access configuration parameters.

For example, the processing unit 520 is specifically configured to: when the threshold includes at least one threshold, select one group of random-access configuration parameters from the at least two groups of random-access configuration parameters based on a correspondence between the at least one threshold and each group of random-access configuration parameters; or select one group of random-access configuration parameters from the at least two groups of random-access configuration parameters based on a correspondence between the at least one threshold, the quantity of transmit beams, and each group of random-access configuration parameters.

For example, the processing unit 520 is specifically configured to: receive system information sent by the network device, where the system information includes the at least two groups of random-access configuration parameters; or receive a broadcast message sent by the network device, where the broadcast message includes the at least two groups of random-access configuration parameters.

For example, the system information further includes the threshold, or the broadcast message further includes the threshold.

It should be understood that, the receiving unit 510 may be implemented by a receiver, the processing unit 520 may be implemented by a processor, and the sending unit 530 may be implemented by a transmitter.

It should be further understood that, the user equipment UE 500 may correspond to the UE described in the foregoing methods, and each module or unit of the user equipment UE 500 is configured to perform each action or process that is performed by the UE in the method embodiment shown in FIG. 3. Herein, to avoid repetition, a detailed description thereof is omitted.

Figure 6:
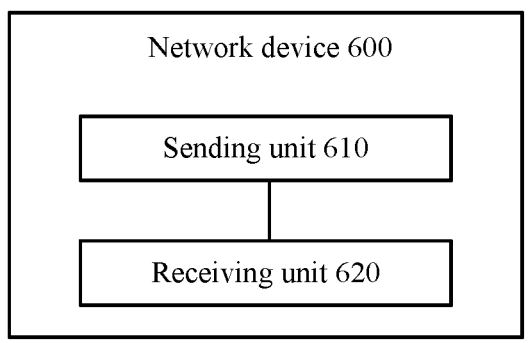
FIG. 6 is a schematic block diagram of a network device according to an embodiment of this application.

FIG. 6 is a schematic block diagram of a network device 600 according to an embodiment of this application. As shown in FIG. 6, the network device 600 includes a sending unit 610 and a receiving unit 620.

The sending unit 610 is configured to send at least two groups of random-access configuration parameters to user equipment (UE_, where the random-access configuration parameters include a maximum quantity of transmissions of a random access preamble and/or a power adjustment step for retransmission of the random access preamble.

The receiving unit 620 is configured to: after the UE selects one group of random-access configuration parameters from the at least two groups of random-access configuration parameters, receive the random access preamble sent by the UE, where transmit power of the random access preamble is determined by the UE based on a maximum quantity of transmissions of the random access preamble and/or a power adjustment step for retransmission of the random access preamble in the selected random-access configuration parameters.

For example, the sending unit 610 is specifically configured to send system information to the UE, where the system information includes the at least two groups of random-access configuration parameters; or send a broadcast message to the UE, where the broadcast message includes the at least two groups of random-access configuration parameters.

For example, the system information further includes a threshold, or the broadcast message further includes the threshold, and the threshold is used by the UE to select one group of random-access configuration parameters from the at least two groups of random-access configuration parameters.

It should be understood that, the sending unit 610 may be implemented by a transmitter, and the receiving unit 620 may be implemented by a receiver.

It should be further understood that, the network device 600 may correspond to the network device described in the foregoing methods, and each module or unit of the network device 600 is configured to perform each action or process that is performed by the network device in the method embodiment shown in FIG. 3. Herein, to avoid repetition, a detailed description thereof is omitted.

Figure 7:
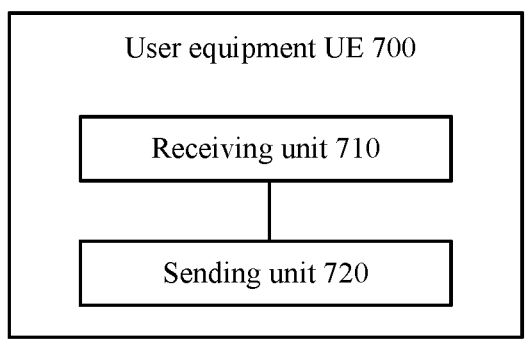
FIG. 7 is a schematic block diagram of user equipment UE according to another embodiment of this application.

FIG. 7 is a schematic block diagram of user equipment UE 700 according to another embodiment of this application. As shown in FIG. 7, the user equipment UE 700 includes: a receiving unit 710 and a sending unit 720.

The receiving unit 710 is configured to receive first resource configuration information sent by a network device, where the first resource configuration information is used to indicate N candidate random access channel RACH resources configured by the network device for the UE, and N≥2.

The sending unit 720 is configured to send a random access preamble to the network device on the N candidate RACH resources indicated by the first resource configuration information that is received by the receiving unit 710.

The receiving unit 710 is further configured to receive second resource configuration information sent by the network device, where the second resource configuration information includes identification information that identifies a target RACH resource, and the target RACH resource is one of the N candidate RACH resources.

The sending unit 720 is further configured to send the random access preamble to the network device on the target RACH resource identified by the identification information.

For example, the receiving unit 710 is specifically configured to receive system information sent by the network device, where the system information includes the first resource configuration information; or receive broadcast information sent by the network device, where the broadcast information includes the first resource configuration information.

For example, the receiving unit 710 is specifically configured to receive RACH scheduling information sent by the network device, where the RACH scheduling information includes the identification information.

For example, the first resource configuration information further includes a maximum quantity of transmissions of the random access preamble or a power adjustment step for retransmission of the random access preamble or both that are configured by the network device for the UE.

For example, each of the N candidate RACH resources corresponds to one receive beam of the network device.

It should be understood that, the receiving unit 710 may be implemented by a receiver, and the sending unit 720 may be implemented by a transmitter.

It should be further understood that, the user equipment UE 700 may correspond to the UE described in the foregoing methods, and each module or unit of the user equipment UE 700 is configured to perform each action or process that is performed by the UE in the method embodiment shown in FIG. 4. Herein, to avoid repetition, a detailed description thereof is omitted.

Figure 8:
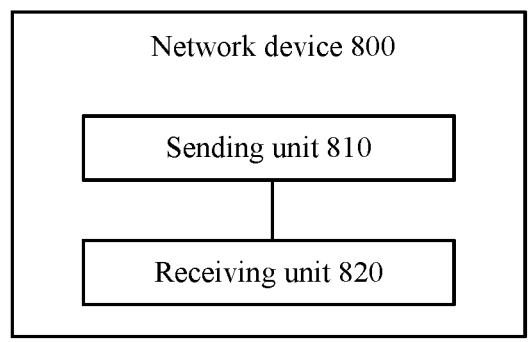
FIG. 8 is a schematic block diagram of a network device according to another embodiment of this application.

FIG. 8 is a schematic block diagram of a network device 800 according to an embodiment of this application. As shown in FIG. 8, the network device 800 includes a sending unit 810 and a receiving unit 820.

The sending unit 810 is configured to send first resource configuration information to user equipment UE, where the first resource configuration information is used to indicate N candidate random access channel RACH resources configured by the network device for the UE, and N≥2.

The receiving unit 820 is configured to receive a random access preamble sent by the UE on the N candidate RACH resources that are indicated by the first resource configuration information.

The sending unit 810 is further configured to send second resource configuration information to the UE, where the second resource configuration information includes identification information that identifies a target RACH resource, and the target RACH resource is one of the N candidate RACH resources.

For example, the sending unit 810 is specifically configured to: send system information to the UE, where the system information includes the first resource configuration information; or send broadcast information to the UE, where the broadcast information includes the first resource configuration information.

For example, the sending unit 810 is specifically configured to send RACH scheduling information to the UE, where the RACH scheduling information includes the second resource configuration information.

For example, the first resource configuration information further includes a maximum quantity of transmissions of the random access preamble or a power adjustment step for retransmission of the preamble or both that are configured by the network device for the UE.

For example, each of the N candidate RACH resources corresponds to one receive beam of the network device.

It should be understood that, the sending unit 810 may be implemented by a transmitter, and the receiving unit 820 may be implemented by a receiver.

It should be further understood that, the network device 800 may correspond to the network device described in the foregoing methods, and each module or unit of the network device 800 is configured to perform each action or process that is performed by the network device in the method embodiment shown in FIG. 4. Herein, to avoid repetition, a detailed description thereof is omitted.

The embodiments of this application may be applied to a processor, or implemented by a processor. The processor may be an integrated circuit chip and has a signal processing capability. During implementation, the steps in the foregoing method embodiments may be completed by an integrated logic circuit of hardware in the processor or by using an instruction in a software form. The processor may be a central processing unit (CPU); or may be another general-purpose processor, a digital signal processor (DSP), an application-specific integrated circuit (ASIC), a field programmable gate array (FPGA) or another programmable logic device, a discrete gate or transistor logic device, or a discrete hardware component; and is capable of implementing or performing the methods, steps, and logical block diagrams disclosed in the embodiments of this application. The general-purpose processor may be a microprocessor, or the processor may be any conventional processor or the like. The steps of the methods disclosed in the embodiments of this application may be directly performed by a hardware decoding processor, or performed by a combination of hardware of a decoding processor and a software unit. The software unit may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing methods in combination with hardware of the processor.

It should be further understood that the memory in the embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but no limitation, many forms of RAMs may be used, for example: a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct Rambus dynamic random access memory (DR RAM). It should be noted that the memory of the systems and methods described in this specification includes but is not limited to these and any memory of another proper type.

It should be understood that sequence numbers of the foregoing processes do not mean execution sequences in the embodiments of this application. The execution sequences of the processes should be determined according to functions and internal logic of the processes, and should not be construed as any limitation on the implementation processes in the embodiments of this application.

During implementation, various steps in the foregoing methods may be completed by an integrated logic circuit of hardware in the processor or by using instructions in a software form. The steps of the random access method disclosed with reference to the embodiments of this application may be directly performed by a hardware processor, or may be performed by using a combination of hardware in the processor and a software unit. The software unit may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing methods in combination with hardware of the processor. To avoid repetition, details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and there may be another division manner in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
receiving a plurality of groups of random-access configuration parameters from a network device, wherein each group of random-access configuration parameters of the plurality of groups of random-access configuration parameters comprises a respective power adjustment step for retransmission of a random access preamble;
selecting a first group of random-access configuration parameters from the plurality of groups of random-access configuration parameters based on a threshold;
determining a transmit power of the random access preamble based on a first power adjustment step for retransmission of the random access preamble comprised in the selected first group of random-access configuration parameters; and
sending the random access preamble to the network device according to the determined transmit power.

2. The method according to claim 1, wherein each group of random-access configuration parameters of the plurality of groups of random-access configuration parameters comprises:
a respective maximum quantity of transmissions of the random access preamble; or
a respective preamble format of a random access channel (RACH); or
the respective maximum quantity of transmissions of the random access preamble and the respective preamble format of the RACH.

3. The method according to claim 2, wherein determining the transmit power of the random access preamble based on the first power adjustment step for retransmission of the random access preamble comprised in the selected first group of random-access configuration parameters comprises:
determining the transmit power of the random access preamble based on the first power adjustment step for retransmission of the random access preamble and the respective maximum quantity of transmissions of the random access preamble comprised in the selected first group of random-access configuration parameters;
determining the transmit power of the random access preamble based on the first power adjustment step for retransmission of the random access preamble and the respective preamble format of the RACH comprised in the selected first group of random-access configuration parameters; or
determining the transmit power of the random access preamble based on the first power adjustment step for retransmission of the random access preamble, the respective maximum quantity of transmissions of the random access preamble comprised in the selected first group of random-access configuration parameters, and the respective preamble format of the RACH comprised in the selected first group of random-access configuration parameters.

4. The method according to claim 1, wherein receiving the plurality of groups of random-access configuration parameters from the network device comprises:
receiving system information from the network device, wherein the system information comprises the plurality of groups of random-access configuration parameters.

5. The method according to claim 4, wherein the system information further comprises the threshold, and the threshold comprises one threshold value or multiple threshold values.

6. The method according to claim 1, wherein the threshold comprises a channel quality threshold.

7. The method according to claim 6, wherein selecting the first group of random-access configuration parameters from the plurality of groups of random-access configuration parameters based on the threshold comprises:
selecting the first group of random-access configuration parameters from the plurality of groups of random-access configuration parameters based on the channel quality threshold and a channel quality that is obtained by measuring different downlink signals corresponding to different transmit beams.

8. An apparatus, comprising:
a processor; and
a non-transitory memory configured to store a program that is executable by the processor, wherein the program includes instructions for:
receiving a plurality of groups of random-access configuration parameters from a network device, wherein each group of random-access configuration parameters of the plurality of groups of random-access configuration parameters comprises a power adjustment for retransmission of a random access preamble;
selecting a first group of random-access configuration parameters from the plurality of groups of random-access configuration parameters based on a threshold;
determining a transmit power of the random access preamble based on a first power adjustment step for retransmission of the random access preamble in the selected first group of random-access configuration parameters; and
sending the random access preamble to the network device according to the determined transmit power.

9. The apparatus according to claim 8, wherein each group of random-access configuration parameters of the plurality of groups of random-access configuration parameters comprises:
a respective maximum quantity of transmissions of the random access preamble; or
a respective preamble format of a random access channel (RACH); or
the respective maximum quantity of transmissions of the random access preamble and the respective preamble format of the RACH.

10. The apparatus according to claim 9, wherein the instructions for determining the transmit power of the random access preamble based on the first power adjustment step for retransmission of the random access preamble in the selected first group of random-access configuration parameters comprise instructions for:
determining the transmit power of the random access preamble based on the first power adjustment step for retransmission of the random access preamble and the respective maximum quantity of transmissions of the random access preamble comprised in the selected first group of random-access configuration parameters;
determining the transmit power of the random access preamble based on the first power adjustment step for retransmission of the random access preamble and the respective preamble format of the RACH comprised in the selected first group of random-access configuration parameters; or
determining the transmit power of the random access preamble based on the first power adjustment step for retransmission of the random access preamble, the respective maximum quantity of transmissions of the random access preamble comprised in the selected first group of random-access configuration parameters, and the respective preamble format of the RACH comprised in the selected first group of random-access configuration parameters.

11. The apparatus according to claim 8, wherein the instructions for receiving the plurality of groups of random-access configuration parameters from the network device comprise instructions for:
receiving the plurality of groups of random-access configuration parameters from the network device by receiving system information from the network device, wherein the system information comprises the plurality of groups of random-access configuration parameters.

12. The apparatus according to claim 11, wherein the system information further comprises the threshold, and the threshold comprises a threshold value.

13. The apparatus according to claim 11, wherein the system information further comprises the threshold, and the threshold comprises multiple threshold values.

14. The apparatus according to claim 8, wherein the threshold comprises a channel quality threshold; and
wherein the instructions for selecting the first group of random-access configuration parameters from the plurality of groups of random-access configuration parameters based on the threshold comprise instructions for:
selecting the first group of random-access configuration parameters from the plurality of groups of random-access configuration parameters based on the threshold by selecting the first group of random-access configuration parameters from the plurality of groups of random-access configuration parameters based on the channel quality threshold and a channel quality that is obtained by measuring different downlink signals corresponding to different transmit beams.

15. The apparatus according to claim 14, wherein
each of the different downlink signals comprises at least one of a synchronization signal, a broadcast channel, or a demodulation reference signal of a broadcast channel.

16. A non-transitory storage medium, configured to store a program that is executable by a processor, wherein the program includes instructions for:
receiving a plurality of groups of random-access configuration parameters from a network device, wherein each group of random-access configuration parameters of the plurality of groups of random-access configuration parameters comprises a respective power adjustment step for retransmission of a random access preamble;
selecting a first group of random-access configuration parameters from the plurality of groups of random-access configuration parameters based on a threshold;
determining transmit power of the random access preamble based on a first power adjustment step for retransmission of the random access preamble comprised in the selected first group of random-access configuration parameters; and
sending the random access preamble to the network device according to the determined transmit power.

17. The storage medium according to claim 16, wherein the instructions for receiving the plurality of groups of random-access configuration parameters from the network device comprise instructions for:
receiving the plurality of groups of random-access configuration parameters from the network device by receiving system information from the network device, wherein the system information comprises the plurality of groups of random-access configuration parameters.

18. The storage medium according to claim 17, wherein the system information further comprises the threshold, and the threshold comprises one threshold value or multiple threshold values.

19. The storage medium according to claim 16, wherein the threshold comprises a channel quality threshold.

20. The storage medium according to claim 19, wherein the instructions for selecting the first group of random-access configuration parameters from the plurality of groups of random-access configuration parameters based on the threshold comprise instructions for:
selecting the first group of random-access configuration parameters from the plurality of groups of random-access configuration parameters based on the threshold by selecting the first group of random-access configuration parameters from the plurality of groups of random-access configuration parameters based on the channel quality threshold and a channel quality obtained by measuring different downlink signals corresponding to different transmit beams.

21. A method, comprising:
sending a plurality of groups of random-access configuration parameters to a terminal device, wherein each group of random-access configuration parameters of the plurality of groups of random-access configuration parameters comprises a respective power adjustment step for retransmission of a random access preamble; and
receiving a random access preamble from the terminal device; and
wherein a transmit power of the random access preamble is based on a first power adjustment step for retransmission of the random access preamble comprised in a first group of random-access configuration parameters, the first group of random-access configuration parameters is selected from the plurality of groups of random-access configuration parameters based on a threshold.

22. The method according to claim 21, wherein each group of random-access configuration parameters of the plurality of groups of random-access configuration parameters comprises:
a respective maximum quantity of transmissions of the random access preamble; or
a respective preamble format of a random access channel (RACH); or
the respective maximum quantity of transmissions of the random access preamble and the respective preamble format of the RACH.

23. The method according to claim 22, wherein the transmit power of the random access preamble being based on the first power adjustment step for retransmission of the random access preamble comprised in the first group of random-access configuration parameters comprises:
the transmit power of the random access preamble being based on the first power adjustment step for retransmission of the random access preamble and the respective maximum quantity of transmissions of the random access preamble comprised in the first group of random-access configuration parameters;
the transmit power of the random access preamble being based on the first power adjustment step for retransmission of the random access preamble and the respective preamble format of the RACH comprised in the first group of random-access configuration parameters; or the transmit power of the random access preamble being based on the first power adjustment step for retransmissions of the random access preamble, the respective maximum quantity of transmissions of the random access preamble comprised in the first group of random-access configuration parameters, and the respective preamble format of the RACH comprised in the first group of random-access configuration parameters.

24. The method according to claim 21, wherein sending the plurality of groups of random-access configuration parameters to the terminal device comprises:
sending system information to the terminal device, wherein the system information comprises the plurality of groups of random-access configuration parameters.

25. The method according to claim 24, wherein the system information further comprises the threshold, and the threshold comprises one threshold value or multiple threshold values.

26. The method according to claim 21, wherein the threshold comprises a channel quality threshold.

27. The method according to claim 26, wherein the first group of random-access configuration parameters being selected from the plurality of groups of random-access configuration parameters based on the threshold comprises:
the first group of random-access configuration parameters being selected from the plurality of groups of random-access configuration parameters based on the channel quality threshold and a channel quality that is obtained based on measurement of different downlink signals corresponding to different transmit beams.

28. An apparatus, comprising:
a processor; and
a non-transitory memory configured to store a program that is executable by the processor, wherein the program includes instructions for:
sending a plurality of groups of random-access configuration parameters to a terminal device, wherein each group of random-access configuration parameters of the plurality of groups of random-access configuration parameters comprises a respective power adjustment step for retransmission of a random access preamble; and
receiving a random access preamble from the terminal device; and
wherein a transmit power of the random access preamble is based on a first power adjustment step for retransmission of the random access preamble comprised in a first group of random-access configuration parameters, and the first group of random-access configuration parameters is selected from the plurality of groups of random-access configuration parameters based on a threshold.

29. The apparatus according to claim 28, wherein each group of random-access configuration parameters of the plurality of groups of random-access configuration parameters comprises:
a respective maximum quantity of transmissions of the random access preamble; or
a respective preamble format of a random access channel (RACH); or
the respective maximum quantity of transmissions of the random access preamble and the respective preamble format of the RACH.

30. The apparatus according to claim 29, wherein the transmit power of the random access preamble being based on the first power adjustment step for retransmission of the random access preamble comprised in the first group of random-access configuration parameters comprises:
the transmit power of the random access preamble being based on the first power adjustment step for retransmission of the random access preamble and the respective maximum quantity of transmissions of the random access preamble comprised in the first group of random-access configuration parameters;
the transmit power of the random access preamble being based on the first power adjustment step for retransmission of the random access preamble and the respective preamble format of the RACH comprised in the first group of random-access configuration parameters; or
the transmit power of the random access preamble being based on the first power adjustment step for retransmission of the random access preamble, the respective maximum quantity of transmissions of the random access preamble comprised in the first group of random-access configuration parameters, and the respective preamble format of the RACH comprised in the first group of random-access configuration parameters.

31. The apparatus according to claim 28, wherein the instructions for sending the plurality of groups of random-access configuration parameters to the terminal device comprise instructions for:
sending the plurality of groups of random-access configuration parameters to the terminal device by sending system information from the apparatus, wherein the system information comprises the plurality of groups of random-access configuration parameters.

32. The apparatus according to claim 31, wherein the system information further comprises the threshold, and the threshold comprises a threshold value or multiple threshold values.

33. The apparatus according to claim 28, wherein the first group of random-access configuration parameters being selected from the plurality of groups of random-access configuration parameters based on the threshold comprises:
the first group of random-access configuration parameters being selected from the plurality of groups of random-access configuration parameters based on a channel quality threshold and a channel quality that is obtained based on measurement of different downlink signals corresponding to different transmit beams.

34. The apparatus according to claim 33, wherein each of the different downlink signals comprises at least one of a synchronization signal, a broadcast channel, or a demodulation reference signal of a broadcast channel.

35. A system, comprising:
a terminal device; and
a network device, wherein the network device is configured to:
sending a plurality of groups of random-access configuration parameters to the terminal device, wherein each group of random-access configuration parameters of the plurality of groups of random-access configuration parameters comprises a respective power adjustment step for retransmission of a random access preamble; and
receive a random access preamble from the terminal device; and wherein the terminal device is configured to:
receive the plurality of groups of random-access configuration parameters from the network device;

select a first group of random-access configuration parameters from the plurality of groups of random-access configuration parameters based on a threshold;

determine a transmit power of the random access preamble based on a first power adjustment step for retransmission of the random access preamble comprised in the selected first group of random-access configuration parameters; and send the random access preamble to the network device according to the determined transmit power.

36. The system according to claim 35, wherein the plurality of groups of random- access configuration parameters is sent from the network device in system information, and the system information further comprises the threshold.

37. The system according to claim 36, wherein the threshold comprises a channel quality threshold.

38. The system according to claim 37, wherein the threshold comprises a channel quality threshold, and the first group of random-access configuration parameters is selected by the terminal device from the plurality of groups of random-access configuration parameters based on the channel quality threshold and a channel quality that is obtained by measuring different downlink signals corresponding to different transmit beams.

39. The system according to claim 38, wherein each of the different downlink signals comprises at least one of a synchronization signal, a broadcast channel, or a demodulation reference signal of a broadcast channel.

* * * * *